United States Patent
Hamada et al.

[11] Patent Number: 5,884,902
[45] Date of Patent: Mar. 23, 1999

[54] DOUBLE-MASS TYPE DYNAMIC DAMPER HAVING TWO DAMPER SYSTEMS

[75] Inventors: Masaaki Hamada; Takahiro Aoi, both of Komaki; Tetsuya Kohgo, Atsugi; Masaaki Mishima, Kasugai, all of Japan

[73] Assignees: Tokai Rubber Industries, Ltd.; Nissan Motor Co., Ltd., both of Japan

[21] Appl. No.: 773,733

[22] Filed: Jan. 21, 1997

Related U.S. Application Data

[63] Continuation of Ser. No. 508,130, Jul. 27, 1995, abandoned.

[30] Foreign Application Priority Data

Jun. 26, 1995 [JP] Japan .................................. 7-159498

[51] Int. Cl.$^6$ .................................. F16F 7/00; F16F 15/00
[52] U.S. Cl. .................................. 267/141; 74/574; 74/604; 188/378; 188/379; 180/381; 267/136; 267/141.2; 267/292; 267/140.5; 464/180
[58] Field of Search .................................. 267/136, 140.11, 267/273–281, 141–141.6, 152, 153, 292–294, 140.3, 140.5; 188/378, 379, 380; 74/604, 574, 573 R; 464/180; 248/559, 562, 638; 180/381, 382; 474/94, 903, 902, 68, 178, 161, 191, 166; 384/125

[56] References Cited

U.S. PATENT DOCUMENTS

| | | | |
|---|---|---|---|
| 3,037,573 | 6/1962 | Larsen | 180/381 |
| 4,083,265 | 4/1978 | Bremer, Jr. | 74/574 |
| 4,114,472 | 9/1978 | Hornig et al. . | |
| 4,224,835 | 9/1980 | Bauer | 74/574 |
| 4,794,816 | 1/1989 | Serizawa et al. | 74/574 |
| 4,815,332 | 3/1989 | Serizawa et al. | 74/574 |
| 5,056,763 | 10/1991 | Hamada et al. . | |
| 5,090,668 | 2/1992 | Hamada | 74/574 |
| 5,145,025 | 9/1992 | Damian | 180/381 |
| 5,156,380 | 10/1992 | Cerruti et al. | 248/559 |
| 5,326,324 | 7/1994 | Hamada | 464/180 |
| 5,346,432 | 9/1994 | Greulich et al. | 464/180 |
| 5,361,878 | 11/1994 | Borsati | 248/559 |
| 5,445,049 | 8/1995 | Ullrich et al. | 267/292 |
| 5,593,144 | 1/1997 | Hamada et al. | 267/141 |

FOREIGN PATENT DOCUMENTS

| | | | |
|---|---|---|---|
| 2716485 | 10/1978 | Germany | 180/381 |
| 2-62442 | 3/1990 | Japan . | |
| 2-190641 | 7/1990 | Japan . | |
| 337450 | 2/1991 | Japan | 464/180 |
| 4-140536 | 5/1992 | Japan . | |
| 1534368 | 12/1978 | United Kingdom . | |
| 1586498 | 3/1981 | United Kingdom . | |
| 1586499 | 3/1981 | United Kingdom . | |

Primary Examiner—Douglas C. Butler
Attorney, Agent, or Firm—Parkhurst & Wendel

[57] ABSTRACT

A double-mass type dynamic damper mounted on a rod-shaped oscillating member, which includes a first damper system and a second damper system that are tuned to two different frequency ranges. Each of the damper systems includes a cylindrical mass member disposed radially outwardly of the oscillating member, and an elastic support member for elastically supporting the mass member with respect to the oscillating member. The elastic support members of the two damper systems are disposed in series and connected to each other in the axial direction. The dynamic damper further includes an elastic connector formed by adjacent parts of the two elastic support members, for elastically connecting axially opposed faces of the two mass members. The two elastic support members have respective spring constants as measured in the radial directions, which spring constants are both larger than a shearing spring constant of the elastic connector that is subjected to shearing stresses upon relative displacement of the mass members in the radial directions.

13 Claims, 14 Drawing Sheets

DOUBLE-MASS TYPE DYNAMIC DAMPER HAVING TWO DAMPER SYSTEMS

This is a Continuation of application Ser. No. 08/508,130 filed Jul. 27, 1995, now abandoned.

BACKGROUND OF THE INVENTION

1. Field of the Invention

The present invention relates to a double-mass type dynamic damper having two secondary vibration systems which are tuned to different frequency ranges, and to a drive shaft equipped with such a double-mass type dynamic damper.

2. Discussion of Related Art

As a type of vibration damping device for reducing vibrations of a rod-shaped oscillating member, such as a shaft, arm or a conduit for forming a fluid passage, used in various mechanical apparatus, there is known a dynamic damper as disclosed in JP-A-2-62442 or JP-A-2-190641, which has a cylindrical mass member disposed radially outwardly of the oscillating member, and an elastic support member for elastically supporting the mass member for connection thereof with the oscillating member.

The dynamic damper of this type exhibits an excellent damping effect with respect to vibrations in a frequency range corresponding to the natural vibration frequency of the damper. To achieve a desired vibration damping effect, therefore, the mass of the mass member and the spring constant of the elastic support member are controlled so that the natural vibration frequency of the dynamic damper is tuned with high accuracy, depending upon the frequency range of the vibrations of the the oscillating member, which are to be damped by this damper.

However, the natural vibration frequency is tuned to a single frequency range, and the dynamic damper is only able to effectively damp vibrations in a narrow or limited frequency range corresponding to the natural vibration frequency. It is thus difficult for the known dynamic damper to provide high damping effects with respect to a plurality of kinds of vibrations applied to the dynamic damper.

When the vibration acceleration of the oscillating member varies, in such a case where the oscillating member in the form of a drive shaft of an automobile generates greatly varying oscillating forces depending upon the running condition of the automobile, for example, the amplitude of the oscillating mass member of the dynamic damper is varied, and the spring constant of the elastic support member is accordingly changed. Consequently, the natural vibration frequency of the dynamic damper is shifted or changed, resulting in reduced damping effects with respect to the vibrations to be damped by the damper.

SUMMARY OF THE INVENTION

It is therefore a first object of the present invention to provide a dynamic damper which exhibits excellent damping effects with respect to input vibrations in a plurality of frequency ranges or over a wide frequency range.

The above object may be accomplished according to a first aspect of the present invention, which provides a double-mass type dynamic damper mounted on a rod-shaped oscillating member, comprising: a first damper system including a cylindrical first mass member disposed radially outwardly of the oscillating member, and a first elastic support member for elastically supporting the first mass member for connection thereof with the oscillating member; a second damper system including a cylindrical second mass member disposed radially outwardly of the rod-shaped oscillating member, and a second elastic support member for elastically supporting the second mass member for connection thereof with the oscillating member; the first and second damper systems being tuned to two different frequency ranges, the first and second elastic support members being disposed in series in an axial direction of the dynamic damper and connected integrally with each other; and an elastic connector formed by adjacent parts of the first and second elastic support members with each other, for elastically connecting axially opposed faces of the first and second mass members, the first and second elastic support members having respective spring constants as measured in radial directions perpendicular to the axial direction, which spring constants are both larger than a shearing spring constant of the elastic connector that is subjected to shearing force upon relative displacement of the first and second mass members in the radial directions.

In the double-mass type dynamic damper constructed as described above, the first and second damper systems are tuned to two different frequency ranges, so as to provide respective vibration damping effects. Thus, the present dynamic damper is able to effectively damp vibrations in a relatively wide frequency range, as compared with a conventional dynamic damper having only one damper system.

Further, in the double-mass type dynamic damper as described above, the oscillation of the first mass member of the first damper system interferes with that of the second mass member of the second damper system, through the elastic connector, for example. Therefore, the spring constants of spring components of the first and second damper systems are less dependent on or less influenced by the oscillating force received from the oscillating member, or the vibration acceleration of the oscillating member. Consequently, the natural vibration frequency of each of the damper systems is less likely to vary with changes of the vibration acceleration of the oscillating member, thus enabling the dynamic damper to provide desired damping effects with high stability.

In one preferred form of the first aspect of the invention, each of the first and second elastic support members includes at least one portion which is interposed between radially opposed surfaces of a corresponding one of the first and second mass members and the oscillating member. The above-indicated at least one portion is adapted to be elastically deformed due to compressive and tensile forces applied thereto. In this arrangement, the first and second elastic support members have relatively large spring constants, and the natural vibration frequencies of the first and second damper systems can be easily tuned to a desired high-frequency range.

The dynamic damper according to the above form of the invention may be advantageously mounted on a drive shaft of an automobile, which is the shorter one of a pair of drive shafts for transmitting drive force to right and left drive wheels of the automobile. In this case, the dynamic damper is able to effectively damp high-frequency vibrations occurring at the shorter drive shaft.

In the above form of the invention, the elastic connector may have a groove formed in at least one of an inner circumferential surface and an outer circumferential surface thereof, the groove extending in a circumferential direction of the dynamic damper between the adjacent parts of the first and second elastic support members. In this case, the shearing spring constant of the elastic connector can be easily set to a sufficiently small value.

In another preferred form of the first aspect of the invention, an annular void is formed in a circumferential direction of the dynamic damper between radially opposed surfaces of each of the first and second mass members and the oscillating member. The annular void has an axial length that is not smaller than an entire axial length of a corresponding one of the first and second mass members, whereby the first and second elastic support members are prevented from being deformed solely by compression thereof. In this case, the elastic connector has a groove formed in at least one of an inner circumferential surface and an outer circumferential surface thereof, the groove extending in the circumferential direction between the adjacent parts of the first and second elastic support members. In this arrangement, the spring constant of the elastic connector can be reduced due to the groove formed between the adjacent parts of the first and second elastic support members. When the first and second elastic support members have small spring constants, therefore, the shearing spring constant of the elastic connector can be easily set to be even smaller than the spring constants of these elastic support members.

The dynamic damper according to the above form of the invention may be advantageously mounted on a drive shaft of an automobile, which is the longer one of a pair of drive shafts for transmitting drive force to right and left drive wheels of the automobile. In this case, the dynamic damper is able to effectively damp low-frequency vibrations occurring at the longer drive shaft.

In a further preferred form of the first aspect of the invention, a ratio of the shearing spring constant of the elastic connector to each of the spring constants of the first and second elastic support members as measured in the radial directions is not smaller than ½. In this case, the oscillation of the first mass member of the first damper system effectively interferes with that of the second mass member of the second damper system, whereby the natural vibration frequencies of the first and second damper systems are further stabilized.

The above-indicated object may also be accomplished according to a second aspect of the invention, which provides a double-mass type dynamic damper mounted on a rod-shaped oscillating member, comprising: an elastic sleeve disposed radially outwardly of the oscillating member, and having a first elastic support member having a first spring constant, and a second elastic support member having a second spring constant smaller than the first spring constant, the first and second elastic support members being formed integrally with each other in an axial direction of the dynamic damper; a first mass member fixed to an outer periphery of the first elastic support member, and being tuned so as to damp high-frequency vibrations; and a second mass member fixed to an outer periphery of the second elastic support member, and being tuned so as to damp low-frequency vibrations, the second mass member having a mass which is smaller than that of the first mass member.

In the double-mass type dynamic damper constructed as described above, the first and second elastic support members have different spring constants, and the first and second mass members have different masses, so as to effectively damp two different frequency ranges of input vibrations, even when a difference between the resonance frequencies of the two mass members are relatively small.

In one preferred form of the second aspect of the present invention, the first elastic support member has a major portion which is subjected to compressive force while the second elastic support member has a major portion which is subjected to shearing force, when the dynamic damper oscillates with the oscillating member. Thus, the spring constants of the first and second elastic support members can be easily determined or changed if needed so as to achieve desired resonance frequencies of the first and second mass members of the dynamic damper.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
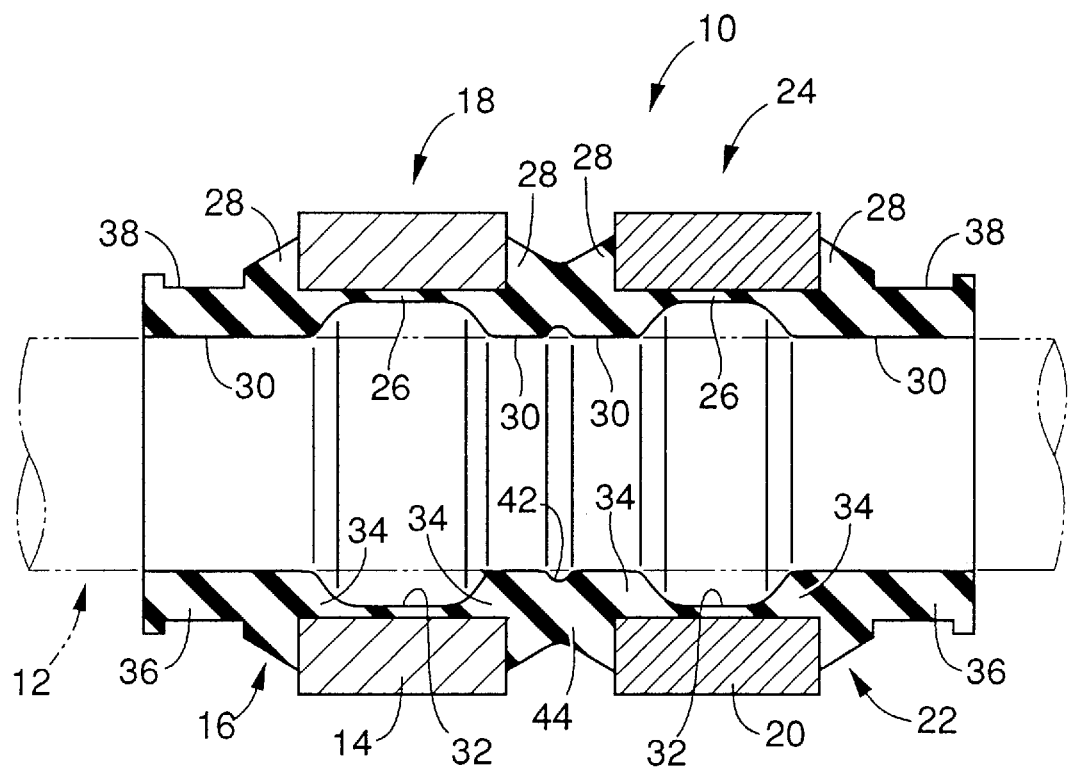
FIG. 1 is an axial cross sectional view of a first embodiment of a dynamic damper of the present invention.

Referring first to FIG. 1, there is illustrated one preferred embodiment of a double-mass type (dual-type) dynamic damper 10 of the present invention. The dynamic damper 10 has a generally cylindrical shape, and is mounted on a rod-like oscillating member 12, such as a drive shaft of an automobile, as indicated by a two-dot chain line in FIG. 1. This dynamic damper 10 utilizes its dynamic damping function to reduce vibrations of the oscillating member 12.

More specifically, the dynamic damper 10 includes a first damper system 18 consisting of a first mass member 14 and a first rubber member 16 serving as a first elastic support member, and a second damper system 24 consisting of a second mass member 20 and a second rubber member 22 serving as a second elastic support member. The first and second damper systems 18, 24 are connected integrally with each other in the axial direction of the dynamic damper 10.

The first mass member 14 and the second mass member 20 are both formed of a material, such as metal, having a relatively large mass. Each of the mass members 14, 20 has a cylindrical shape with a relatively large thickness, and has an inside diameter that is larger than the outside diameter of the oscillating member 12.

The first and second rubber members 16, 22 are both formed of a suitable rubber material, and are secured by vulcanization to the first and second mass members 14, 20, respectively. Each of the rubber members 16, 22 includes an axially middle thin-walled portion, which provides a rubber layer 26 for covering the inner circumferential surface of the corresponding mass member 14, 20. Each rubber member 16, 22 further includes axially opposite tapering portions 28, 28 which extend axially outwards and radially inwards from the axial end faces of the corresponding mass member 14, 22. The tapering portions 28, 28 of the elastic members 16, 22 have respective inner circumferential contact surfaces 30, 30 at their ends remote from the mass members 18, 24, which surfaces are in pressed contact with and fixed to the outer circumferential surface of the oscillating member 12. With the rubber layers 26 having an inside diameter larger than the outside diameter of the oscillating member 12, there is formed an annular void 32 which extends in the circumferential direction between radially opposed faces of the oscillating member 12 and each of the first and second mass members 14, 20. The annular voids 32, 32 are radially aligned with axially middle portions of the first and second mass members 14, 20, respectively.

In the instant embodiment, the axial length of the annular void 32 is smaller than the axial length of the corresponding mass member 14, 20. Therefore, axially opposite portions 34, 34 of the first and second rubber members 16, 22 are interposed between radially opposed surfaces of the corresponding mass member 14, 20 and the oscillating member 12. In operation, these portions 34, 34 are deformed due to compressive and tensile forces applied thereto. More specifically, when the first and second mass members 14, 20 are displaced in the radial directions relative to the oscillating member 12 upon application of a vibrational load thereto, these portions 34, 34 undergo deformation only due to the compressive and tensile forces, while other portions of the rubber members 16, 22 located axially outwardly of the first and second mass members 14, 20 mainly undergo shearing deformation. In this arrangement, the dynamic damper 10 as a whole exhibits a relatively large spring constant.

The first and second rubber members 16, 22 are connected integrally with each other at the mutually facing axial ends of the adjacent tapering portions 28, and are thus formed as an integral elastic body. That is, the first and second rubber members 16, 22 cooperate with the first and second mass members 14, 20 to provide a single, integral vulcanized assembly. These rubber members 16, 22 also include respective cylindrical extensions 36 which extend axially outwards from the axial ends of the tapering portions 28 located opposite to the above-indicated adjacent tapering portions 28 with respect to the mass members 14, 20. In the outer circumferential surface of each of the cylindrical extensions 36, there is formed a circumferential groove 38 for receiving a belt (not shown) for tightly holding the dynamic damper 10 against the oscillating member 12, so that the damper 10 is firmly fixed in position with respect to the oscillating member 12.

A circumferential groove 42 having a generally wedge-shaped or semi-cylindrical cross section is formed in an inner circumferential surface of a rubber connector 44 (which will be described) for connecting the first and second rubber members 16, 22, such that the groove 42 extends in the circumferential direction between the adjacent contact surfaces 30, 30 of the first and second rubber members 16, 22.

The thus constructed dynamic damper 10 is installed on the oscillating member 12 by inserting the member 12 into the damper 10. In this condition, the first and second mass members 14, 20 are elastically supported by the first and second rubber members 16, 22, respectively, such that the mass members 14, 20 are radially displaceable with respect to the oscillating member 12. Thus, the oscillating member 12 serves as a primary vibration system while the first and second damper systems 18, 24 serve as a secondary vibration system. The first and second damper systems 18, 24 have different natural vibration frequencies, which are determined depending upon the mass of each mass component (14, 20), and/or the spring constant of each spring component (16, 22). Thus, the first and second damper systems 18, 24 are tuned so as to provide respective damping effects with respect to different frequency ranges of undesired vibrations transmitted from the oscillating member 12. In this particular embodiment, both of the first and second rubber members 16, 22 include the portions 34 which are deformable due to compressive and tensile forces applied thereto. Accordingly, the dynamic damper 10 exhibits a relatively large spring constant in radial directions perpendicular to the axial direction thereof. For example, the natural vibration frequencies of the first and second damper systems 18, 24 can be easily tuned to a relatively high frequency range of 200 Hz or higher, so as to damp undesired vibrations which tend to occur at the shorter one of two parallel drive shafts having different axial lengths.

The first and second mass members 14, 20 provide respective mass components of the first and second damper systems 18, 24, and the first and second rubber members 16, 22 provide respective spring components of these damper systems 18, 24. With the first and second rubber members 16, 22 connected integrally with each other as described above, the adjacent parts of these rubber members 16, 22 constitute an elastic connector in the form of the rubber connector 44 for elastically connect axially opposed faces of the first and second mass members 14, 20 with each other. This rubber connector 44 has an influence on the spring components of the first and second damper systems 18, 24, as will be described later in detail.

Figure 2:
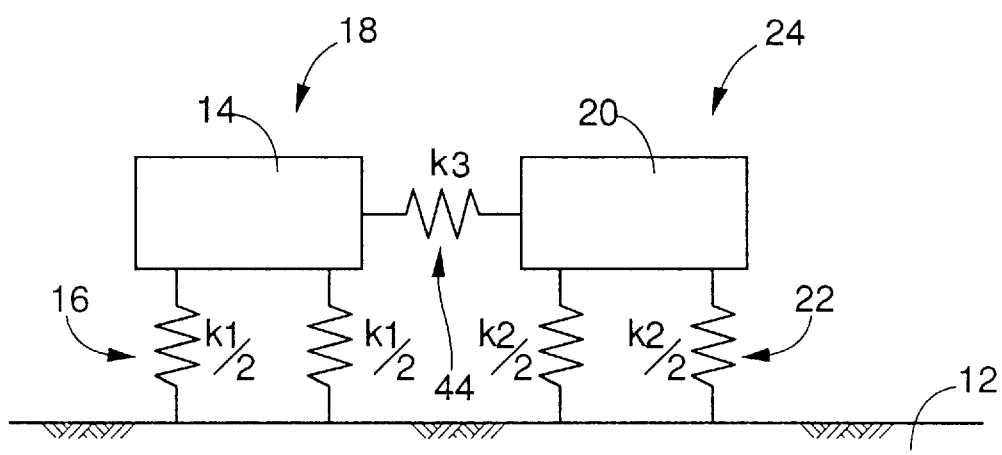
FIG. 2 is a diagram showing a dynamic model of the dynamic damper of FIG. 1.

A dynamic model of the dynamic damper 10 of the present embodiment is illustrated in FIG. 2, in which "$k_1$", "$k_2$" represent respective spring constants of the first and second rubber members 16, 22 in the radial directions, and "$k_3$" represents a shearing spring constant of the rubber connector 44, which is a spring constant as measured upon shearing deformation of the rubber 44 due to relative displacement of the first and second mass members 14, 20 in the radial directions.

If the shearing spring constant "$k_3$" of the rubber connector 44 is too large, the oscillation phases of the first and second mass members 14, 20 or the displacements thereof relative to the oscillating member 12 greatly interfere with each other, whereby the resonance of one of of the first and second damper systems 18, 24 is combined with that of the other damper system, resulting in reduced damping effects of the respective damper systems 18, 24. Accordingly, the shearing spring constant "$k_3$" of the rubber connector 44 needs to be smaller than the spring constants "$k_1$" and "$k_2$" of the first and second rubber members 16, 22 in the radial directions. In the instant embodiment in which both of the first and second rubber members 16, 22 of the instant embodiment include the portions 34 subjected to compressive and tensile forces, the spring constants "$k_1$" and "$k_2$" of these rubber members 16, 22 in the radial directions can be readily set to be sufficiently large. Further, the shearing spring constant "$k_3$" of the rubber connector 44 can be set to be sufficiently small, since the groove 42 is formed in the inner circumferential surface of the axially middle portion of the rubber connector 44. Thus, the shearing spring constant "$k_3$" of the rubber connector 44 is easily set to be smaller than the radial spring constants "$k_1$" and "$k_2$" of the first and second rubber members 16, 22.

In the dynamic damper 10 constructed as described above, the spring constants of the spring components of both of the first and second damper systems 18, 24 are influenced by the rubber connector 44 as well as the first and second rubber members 16, 22. Therefore, the spring constant of the dynamic damper 10 is less likely to be changed with a change of the state of oscillation (vibration acceleration) of the oscillating member 12. Accordingly, the dynamic damper 10 can effectively and stably damp vibrations in the frequency ranges to which the first and second damper systems 18, 24 are tuned, irrespective of the state of oscillation of the oscillating member 12.

Figure 3:
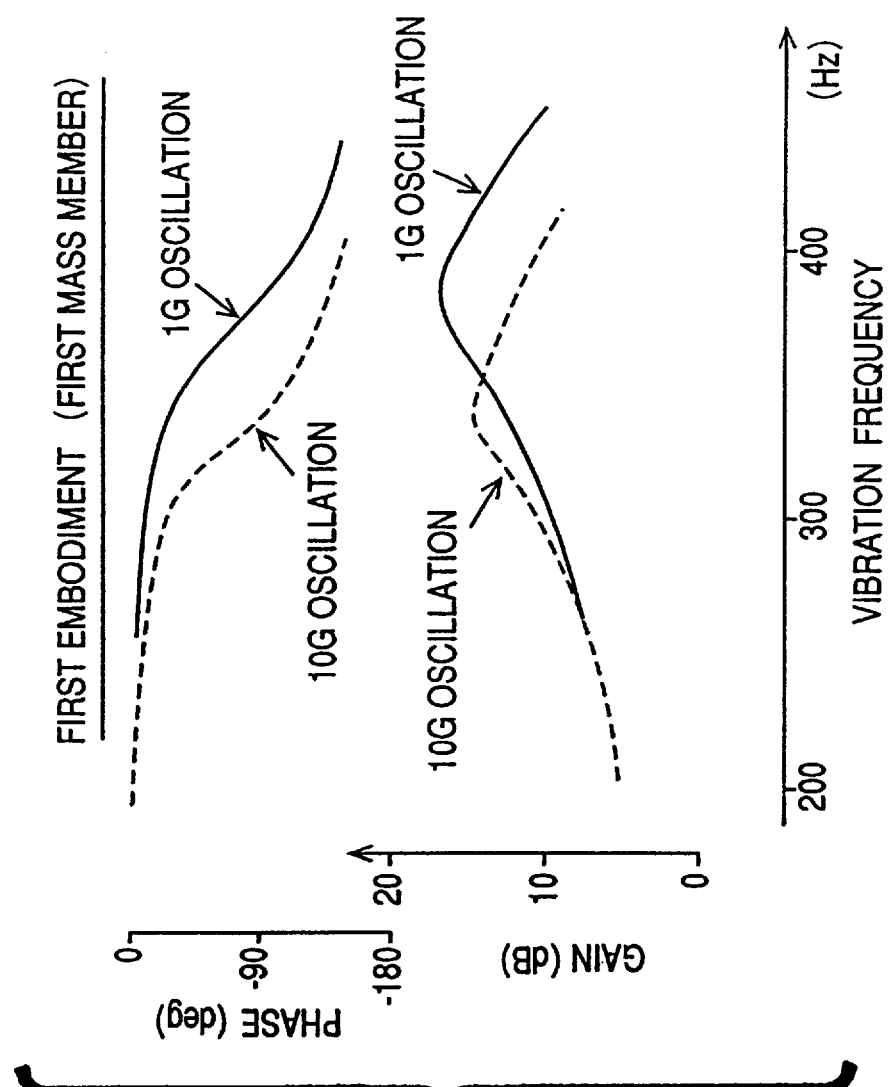
FIG. 3 is a graph indicating the dependency of the natural vibration frequency of a first damper system of the dynamic damper of FIG. 1 on the oscillating force received from an oscillating member.
Figure 4:
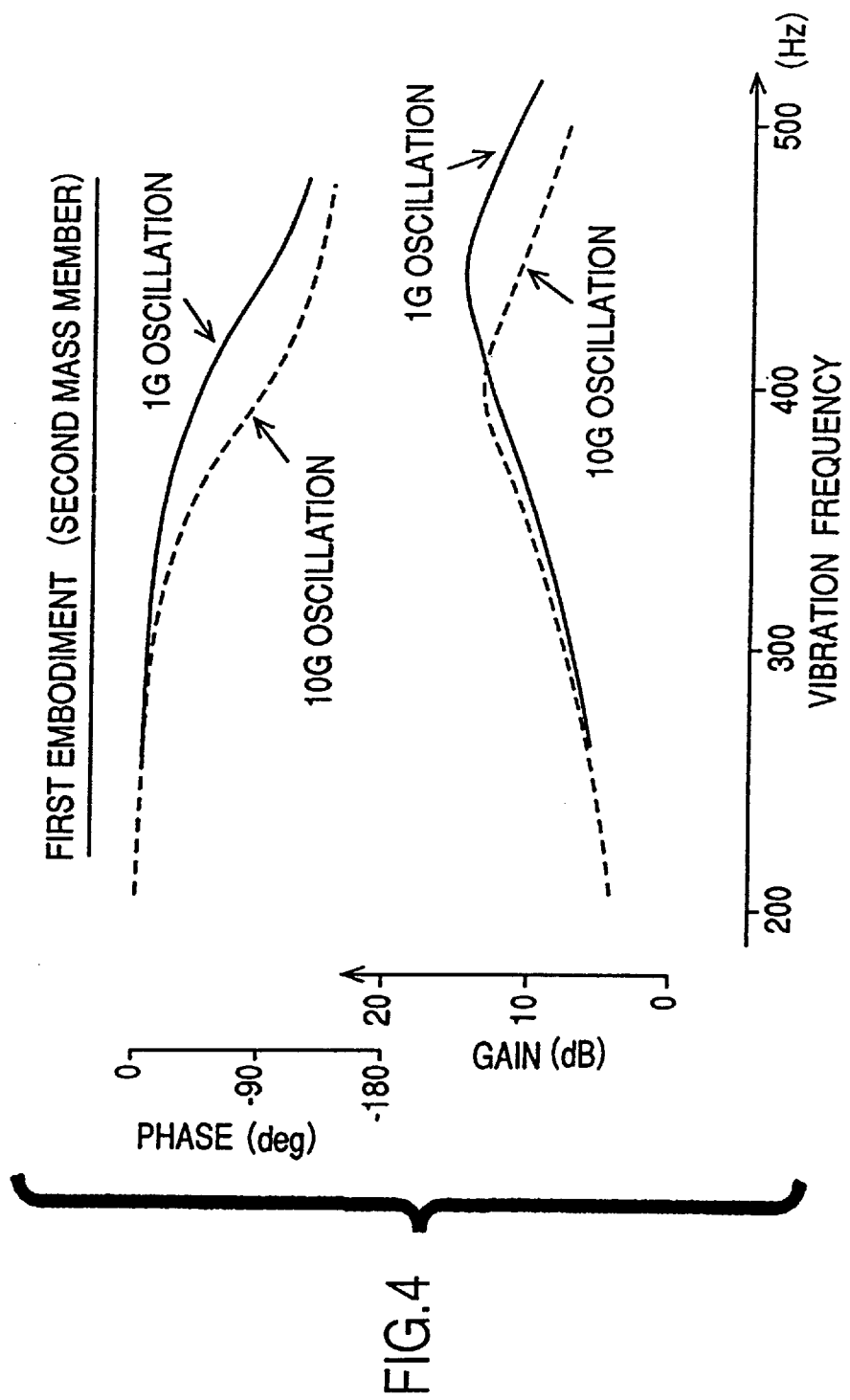
FIG. 4 is a graph indicating the dependency of the natural vibration frequency of a second damper system of the dynamic damper of FIG. 1 on the oscillating force.
Figure 5:
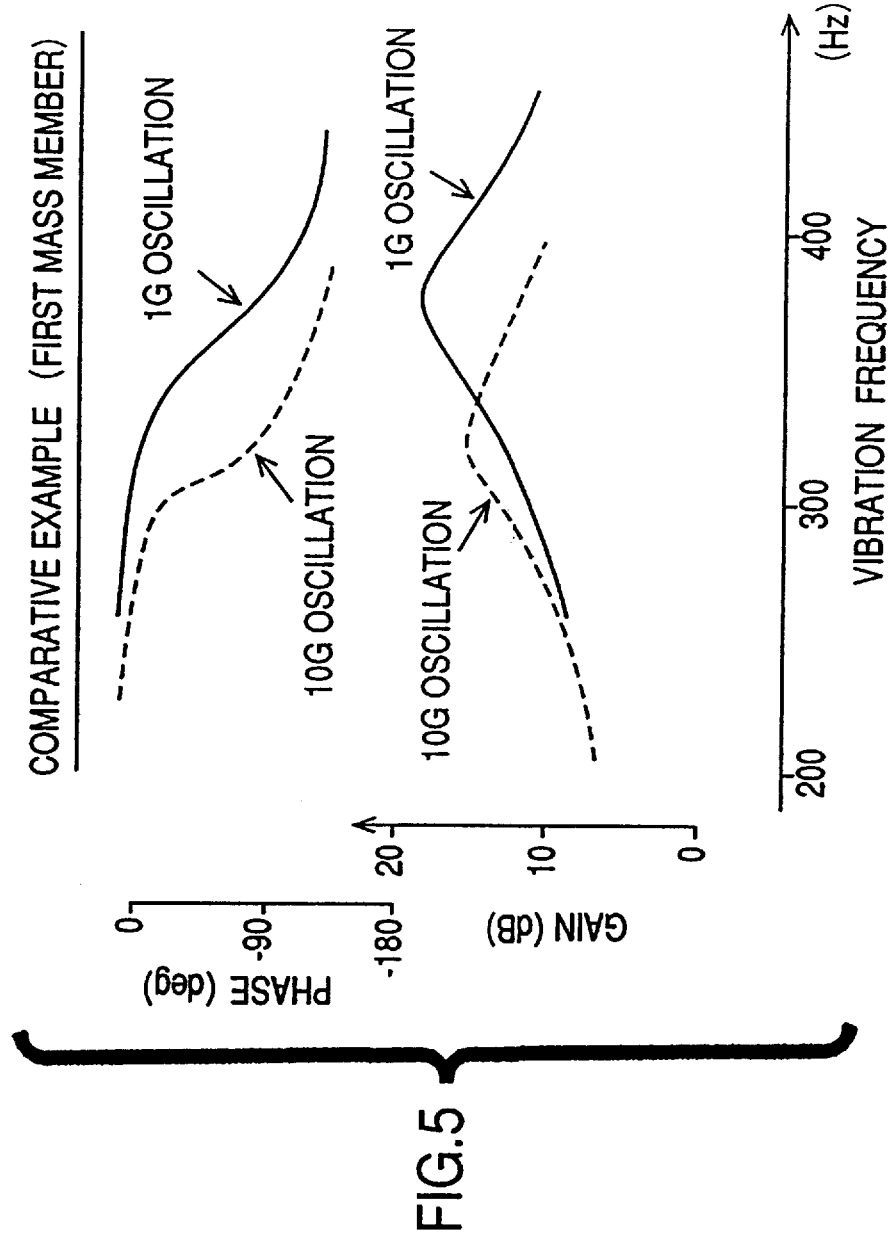
FIG. 5 is a graph indicating the dependency of the natural vibration frequency of a separate first damper system of a comparative example of dynamic damper, on the oscillating force received from an oscillating member.
Figure 6:
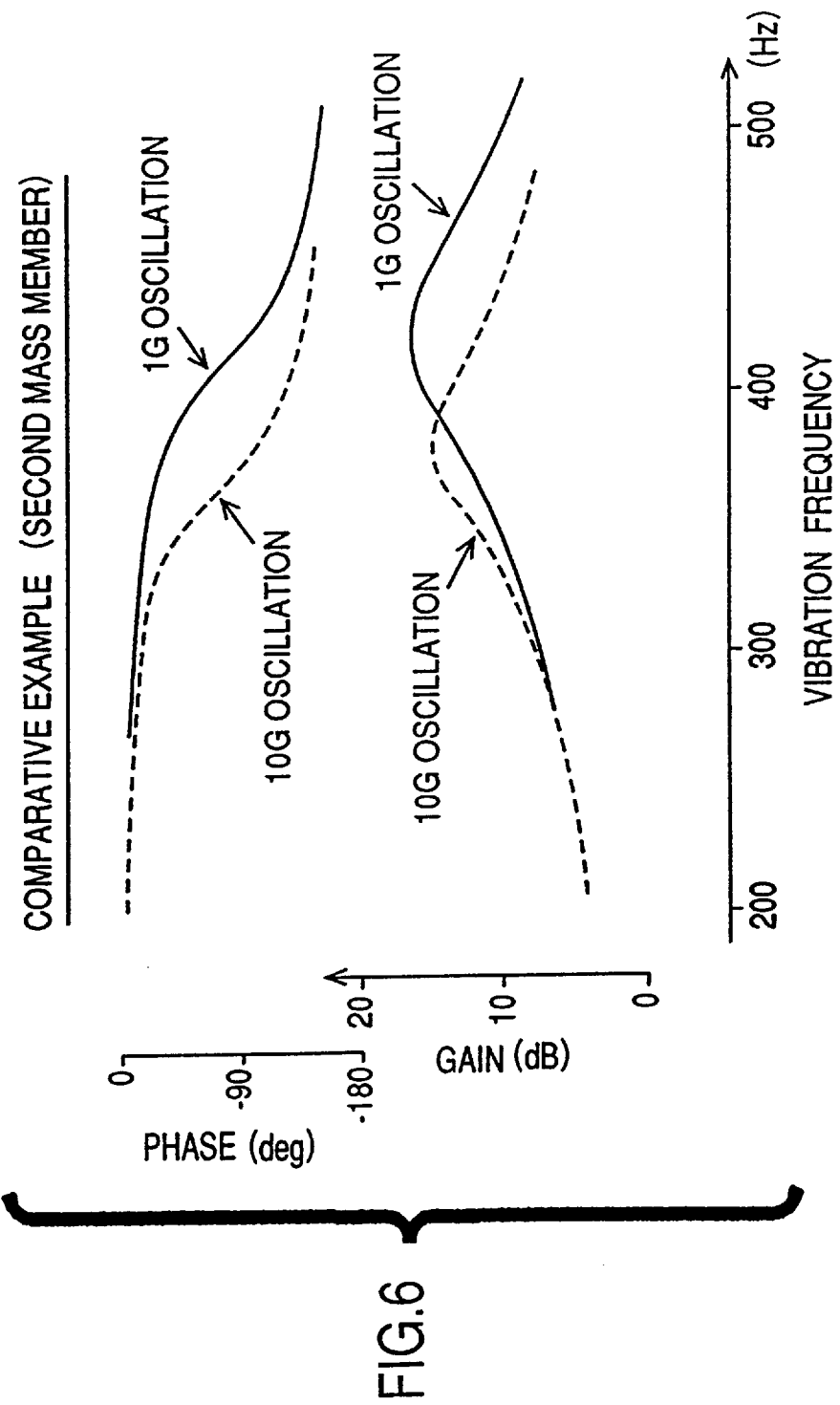
FIG. 6 is a graph indicating the dependency of the natural vibration frequency of a separate second damper system of the comparative example on the oscillating force.

An example of the dynamic damper 10 of the present embodiment was installed on the oscillating member 12, with sensors respectively attached to the first and second mass members 14, 20. Then, the natural vibration frequencies of the first and second damper systems 18, 24 were measured when the oscillating member 12 was oscillated in the radial directions at a constant acceleration of 1 G and when it was oscillated at a constant acceleration of 10 G, so as to detect a change of the natural vibration frequencies of these damper systems 18, 24 with a change of the vibration acceleration of the oscillating member 12. The results of the measurements are indicated in the graphs of FIGS. 3 and 4, and TABLE 1 below. A comparative example was formed by separating the first and second rubber members 16, 22 of the dynamic damper 10 from each other, along the groove 42, to thus substantially eliminate the rubber connector 44. That is, the comparative example had separate or independent first and second damper systems. The natural vibration frequencies of these first and second damper systems of the comparative example were also measured when the oscillating member 12 was oscillated at 1 G in the radial directions and when it was oscillated at 10 G. The results of the measurements are indicated in the graphs of FIGS. 5 and 6 and TABLE 1 below.

TABLE 1

|  | Inherent vibration frequency (Hz) | | Rate (%) of change of frequency |
|---|---|---|---|
|  | 1G | 10G | [(10G-1G)/1G] |
| Embodiment |  |  |  |
| First damper system | 392 | 345 | −12 |
| Second damper system | 438 | 400 | −9 |
| Comparative Example |  |  |  |
| First damper system | 374 | 322 | −14 |
| Second damper system | 417 | 375 | −10 |

It will be apparent from the measurement results indicated above that the natural vibration frequencies of the first and second damper systems 18, 24 of the instant embodiment are changed with a change of the vibration acceleration, by a smaller amount than those of the first and second damper systems of the comparative example. This means that the dynamic damper 10 of the present embodiment exhibits vibration damping effects with improved stability.

In the double-mass structure of the instant embodiment in which the first and second damper systems 18, 24 are connected to each other, with the rubber connector 44 elastically connecting the mass members 14, 20, the natural vibration frequencies of the damper systems 18, 24 are less likely to be changed upon a change of the vibration acceleration, assuring stable damping functions of the respective damper systems 18, 24.

More specifically explained referring to the model shown in FIG. 2, the spring components of the first and second damper systems 18, 24 include the rubber connector 44 as well as the rubber members 16, 22, and the spring constant of the spring component of each of the damper systems 18, 24 is determined by a combination of the corresponding rubber member 16, 22 and the rubber connector 44. The first and second rubber members 16, 22 are directly deformed by the corresponding mass members 14, 20 which oscillate due to oscillating force transmitted from the oscillating member 12, while the rubber connector 44 is not directly deformed by the oscillating mass members 14, 20, but deformed due to relative displacement of the two mass members 14, 20. Thus, the rubber connector 44 is less likely to be influenced by the oscillating force from the oscillating member 12, as compared with the rubber members 14, 22. That is, the spring constant of the rubber connector 44 is less dependent upon the oscillating force of the oscillating member 12. Due to the presence of the rubber connector 44, therefore, the dependency of the spring constants of the first and second rubber members 16, 22 on the oscillating force is reduced, and the spring constants of the spring components of the first and second damper system 18 vary by reduced amounts with a change of the vibration acceleration.

Figure 7:
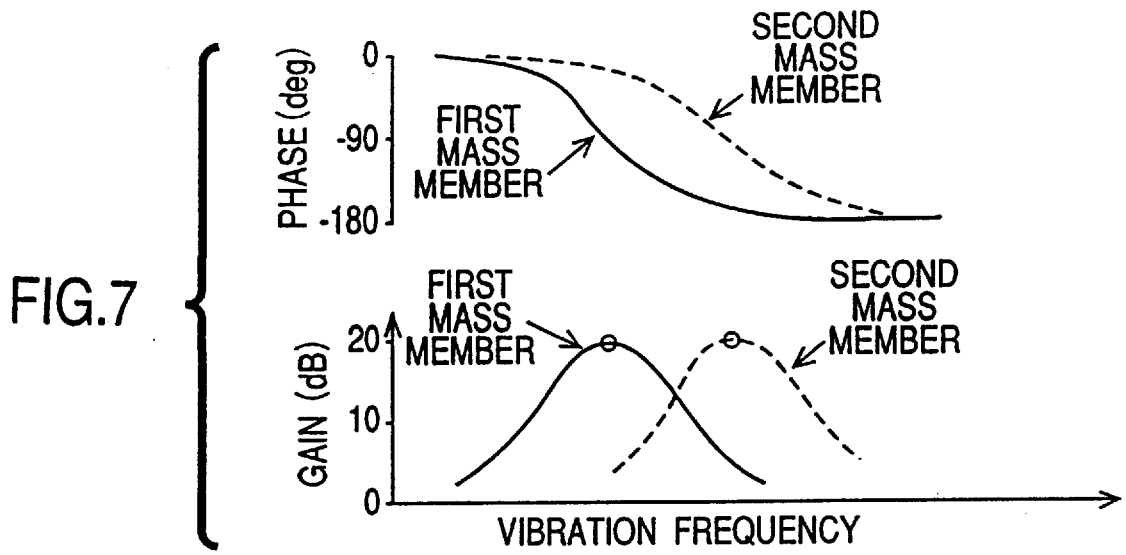
FIG. 7 is a graph indicating the relationship of the phase and resonance amplitude of the dynamic damper of FIG. 1 with the oscillating force applied thereto.
Figure 8:
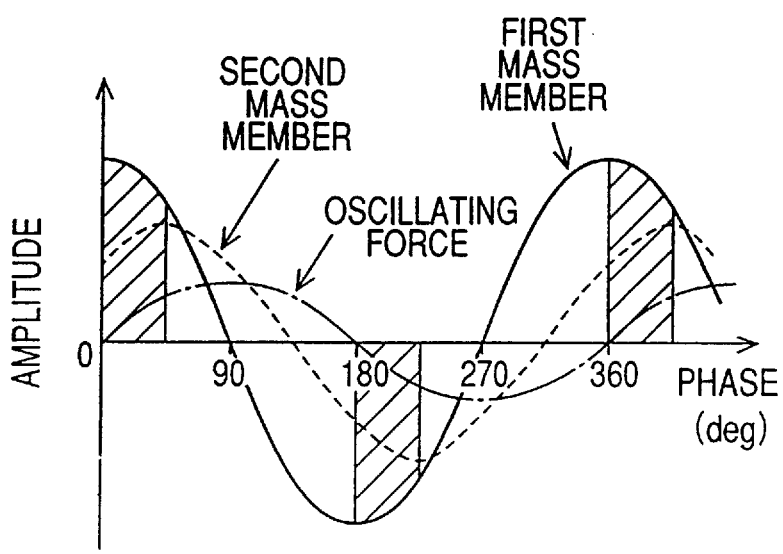
FIG. 8 is a graph indicating the phase difference between the first and second mass members of the dynamic damper of FIG. 1 in relation to the oscillating force, when the first damper system resonates.

The phase difference and resonance amplitudes of the first and second damper systems 18, 24 are indicated in FIG. 7 in relation to the oscillation force applied from the oscillating member 12. In particular, the relationship between the oscillation phase and amplitude of the damper systems 18, 24 upon resonance of the first damper system 18 is generally shown in FIG. 8, which include hatched areas where the first mass member 14 is displaced in the reversed phase with respect to the second mass member 20. In these hatched areas, the first mass member 14 which is in the resonance state receives the reverse force from the second mass member 20 through the rubber connector 44. As a result, the spring constant of the spring component of the first damper system 18 is increased. Particularly, the amount of relative displacement between the first and second mass members 14, 20 is increased with an increase in the vibration acceleration, resulting in an increase in the reverse force acting on the first mass member 14 through the rubber connector 44. This avoids undesirable reduction in the spring constant due to the increased vibration acceleration, and resulting reduction in the natural vibration frequency of the first damper system 18. Thus, the dynamic damper 10 exhibits stable damping characteristics. The same principle may be applied to the case where the second damper system 24 resonates. In this case, the second mass member 20 receives the reverse force through the rubber connector 44, which force avoids reduction in the natural vibration frequency of the second damper system 24 due to the increased vibration acceleration.

If the shearing spring constant "$k_3$" of the rubber connector 44 is too small when the first and second mass members 14, 20 are displaced relative to each other in the radial directions, the interference between the first and second mass members 14, 20 as described above may not lead to sufficiently high stability of the natural vibration frequencies of the first and second damper systems 18, 24. Accordingly, the shearing spring constant "$k_3$" of the rubber connector 44 is desirably determined in relation to the spring constants "$k_1$", "$k_2$" of the first and second rubber members 16, 22 in the radial directions, so that the ratios $k_3/k_1$ and $k_3/k_2$ are not smaller than ½.

Figure 9:
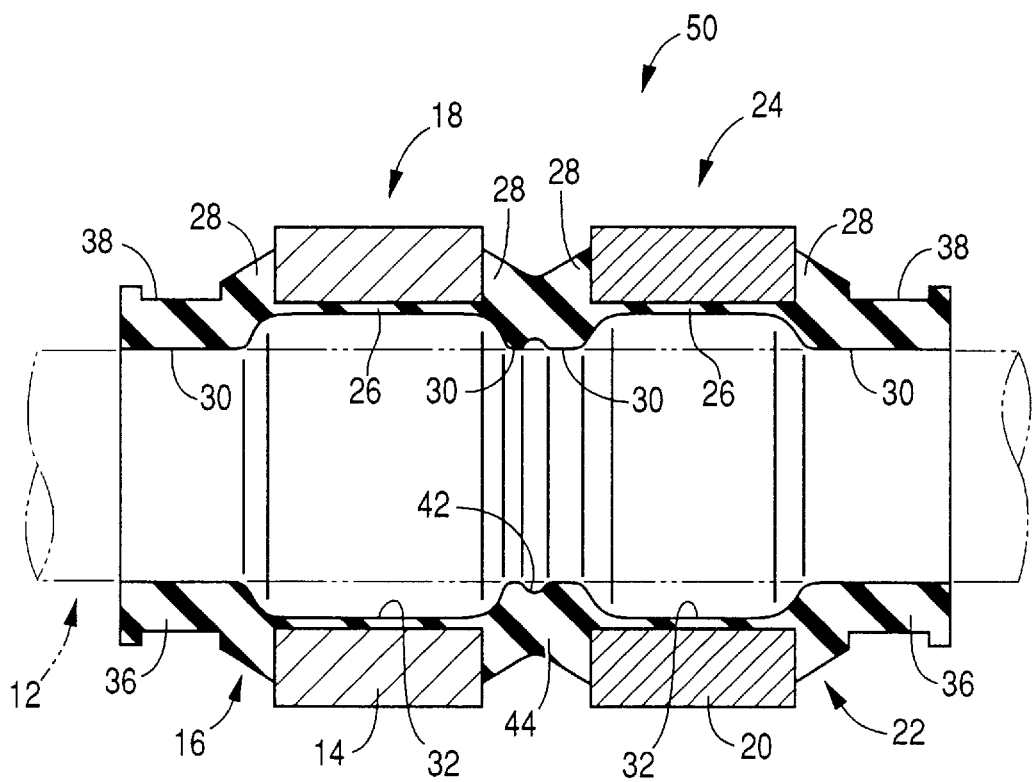
FIG. 9 is an axial cross sectional view showing a second embodiment of a dynamic damper of the present invention.

Referring next to FIG. 9, there is illustrated a dynamic damper 50 as a second embodiment of the present invention. In the following description of this embodiment, the same reference numerals as used in the first embodiment will be used for identifying structurally/functionally corresponding elements, which will not be explained in detail.

In the dynamic damper 50 of this embodiment, the annular voids 32, 32 of the first and second damper systems 18, 24 are formed over the entire axial lengths of the first and second mass members 14, 20, respectively. Therefore, the first rubber member 16 is not present between the radially opposed surfaces of the first mass member 14 and the oscillating member 12, and the second rubber member 22 is not present between the radially opposed surfaces of the second mass member 20 and the oscillating member 12. That is, no portion of the rubber members 16, 22 is subjected to compressive/tensile forces applied between the mass members 14, 20 and the oscillating member 12.

In the above arrangement, the first and second rubber members 16, 22 for elastically connecting the first and second mass members 14, 20 with the oscillating member 12 are not deformed due to pure compression thereof, but may be deformed due to shearing and compressive stresses, when the first and second mass members 14, 20 are displaced in the radial directions due to oscillation of the oscillating member 12.

In the thus constructed dynamic damper 50, the rubber connector 44 is provided for connecting the axially opposed faces of the first and second mass members 14, 20, as in the first embodiment, whereby the natural vibration frequencies of the first and second damper systems 18, 24 are satisfactorily stabilized. In addition, the first and second rubber members 16, 22 of the dynamic damper 50 are prevented from being deformed due to pure compression thereof, thus making it easy to establish relatively small spring constants "$k_1$", "$k_2$" of these rubber members 16, 22 in the radial directions. For example, the natural vibration frequencies of the first and second damper systems 18, 24 may be easily tuned to a relatively low frequency range of 200 Hz or lower, so as to damp undesired vibrations which may occur at the longer one of the two parallel drive shafts having different axial lengths.

In the dynamic damper 50 of the present embodiment, the circumferential groove 42 is formed in the axially middle portion of the inner circumferential surface of the rubber connector 44, as in the first embodiment. This groove 42 makes it easy to set the shearing spring constant "$k_3$" of the rubber connector 44 to be further smaller than the radial spring constants "$k_1$" and "$k_2$" of the first and second rubber members 16, 22, even if the spring constants "$k_1$" and "$k_2$" are relatively small.

Figure 11:
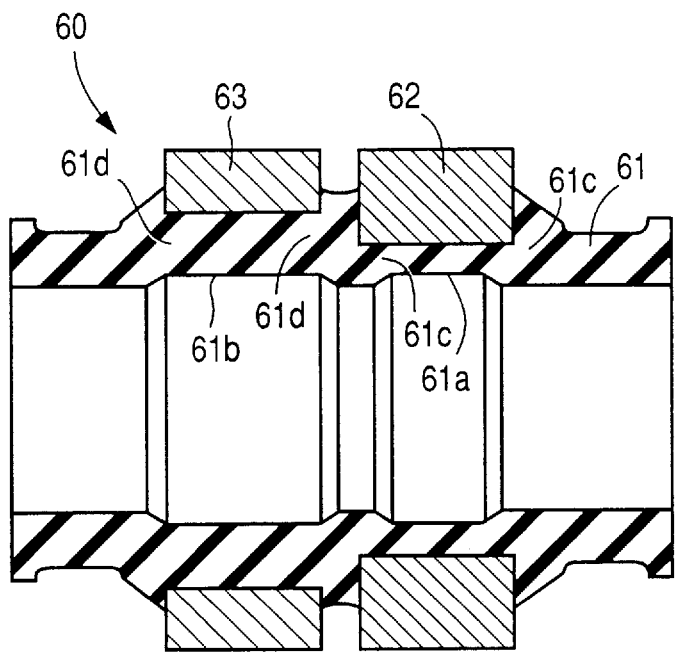
FIG. 11 is a cross sectional view of a third embodiment of the dynamic damper of the present invention.

Referring next to FIG. 11, there is shown in cross section a dynamic damper 60 as a third embodiment of the present invention. The dynamic damper 60 includes an elastic sleeve 61 formed of a suitable rubber material, which has a first elastic support member including a pair of first elastic portions 61c having a relatively large spring constant or high stiffness, and a second elastic support member including a pair of second elastic portions 61d having a relatively small spring constant or low stiffness. The first and second elastic support members are formed integrally with each other in the axial direction. The dynamic damper 60 further includes a first mass member 62 and a second mass member 63, which are respectively secured to the outer peripheries of the first elastic portions 61c and the second elastic portions 61d, respectively. The first mass member has a relatively large mass and is adapted to damp high-frequency vibrations, while the second mass member has a relatively small mass and is adapted to damp low-frequency vibrations. In this embodiment, the first elastic support member including the first elastic portions 61c, and the first mass member 62 constitute a first dynamic system, and the second elastic support member including the second elastic portions 61b, and the second mass member 63 constitute a second dynamic system.

The elastic sleeve 61 having a generally cylindrical shape is formed by vulcanizing a suitable rubber material. First circumferential groove 61a is formed in the inner circumferential surface of the first elastic support member, such that the groove 61a is radially aligned with the first mass member 62. The first groove 61a has a slightly smaller axial length than the first mass member 62. The first elastic portions 61c, 61c as part of the elastic sleeve 61 are formed on the axially opposite sides of the first groove 61a. Second circumferential groove 61b is formed in the inner circumferential surface of the second elastic support member, such that the groove 61b is radially aligned with the second mass member 63. The second groove 61b has a slightly larger axial length than the second mass member 63. The second elastic portions 61d, 61d are formed on the axially opposite sides of the second groove 61d. The first elastic portion 61c and second elastic portion 61d which are adjacent to each other at the axially middle portion of the elastic sleeve 61 are formed integrally with each other. Thus, the first and second elastic support members are formed into the integral elastic sleeve 61.

The first mass member 62 with a large mass is a ring-shaped member made of metal, such as iron, and is adapted to damp high-frequency vibrations. This first mass member 62 is secured to the outer peripheries of the first elastic portions 61c, and is radially aligned with the first groove 61a. Thus, the first mass member 62 is elastically supported by the first elastic portions 61c which are elastically deformed mainly due to compression thereof during operation.

The second mass member 63 with a small mass is a ring-shaped member made of a relatively light material, and is adapted to damp low-frequency vibrations. The inside diameter of the second mass member 63 is larger than that of the first mass member 62, while the other dimensions of the second mass member 63 are substantially equal to those of the first mass member 62. This second mass member 63 is secured to the outer peripheries of the second elastic portions 61d, and is radially aligned with the second circumferential groove 61b. Thus, the second mass member 63 is elastically supported by the second elastic portions 61d. In operation, the second elastic portions 61d are elastically deformed due to shearing stresses applied thereto in the radial directions, since the axial length of the groove 61b is larger than that of the second mass member 63.

The first and second mass members 62, 63 are secured to the first and second elastic portions 61c, 61d, respectively, when the elastic sleeve 61 is formed by means of vulcanization.

In the dynamic damper 60 of the present embodiment, the desired resonance frequency of the first mass member 62 is established by suitably determining the spring constant of the first elastic portions 61c, in view of the weight of the mass member 62, axial length of the first groove 61a, hardness of the rubber material for the elastic portions 61c and others. On the other hand, the desired resonance frequency of the second mass member 63 is established by suitably determining the spring constant of the second elastic portions 61d, in view of the weight of the mass member 63, axial length of the second groove 61b, hardness of the rubber material for the elastic portions 61d and others. In the present dynamic damper 60, the desired resonance frequency range of the first mass member 62 is around 540 Hz, and the desired resonance frequency range of the second mass member 63 is around 390 Hz.

The dynamic damper 60 of the instant embodiment is mounted on a rod-shaped oscillating member, such as a drive shaft, which is likely to cause relatively large vibrations. When the oscillating member oscillates in the directions perpendicular to the axial direction thereof, the first mass member 62 resonates through the elastic deformation of the first elastic portions 61c, and the second mass member 63 resonates through the elastic deformation of the second elastic portions 61d. The resonance of the first mass member 62 becomes large in the higher frequency range around 540 Hz, while the resonance of the second mass member 63 becomes large in the lower frequency range around 390 Hz. Thus, the dynamic damper 60 is able to effectively damp the vibrations both in the higher and lower frequency ranges as indicated above.

Accordingly, the dynamic damper 60 of the present embodiment exhibits excellent damping effects with respect to vibrations in the two different frequency ranges to which the two dynamic systems including the first and second mass members 62, 63 are respectively tuned, even when there is only a small difference between the resonance frequency ranges of these mass members 62, 63. That is, the first and second mass members 62, 63 resonate effectively in the respective resonance frequency ranges, without suffering from changes of the natural vibration frequencies of the dynamic systems, and reduction of the resonance amplitudes and damping effects.

Further, the dynamic damper 60 of the instant embodiment can be made compact or small-sized, since the adjacent first and second elastic portions 61c, 61d of the elastic sleeve 61 are formed integrally with each other. The dynamic damper 60 thus constructed can be installed exactly on a limited portion of the oscillating member which causes relatively large vibrations, so as to effectively damp the vibrations.

In the dynamic damper 60 as described above, the axial lengths of the first and second grooves 61a, 61b are determined so that the first elastic portions 61c of the elastic sleeve 61 are mainly subjected to compressive forces, and the second elastic portions 61d are mainly subjected to shearing forces, when the dynamic damper 60 receives vibrations from the oscillating member. Thus, the spring constants of the first and second elastic portions 61c, 61d can be easily changed by changing the axial lengths of the grooves 61a, 61b. This makes it possible to freely select the resonance frequency ranges of the two dynamic systems (including the first and second mass members 62, 63) of the dynamic damper 60, only requiring a simple damping structure.

Figure 14:
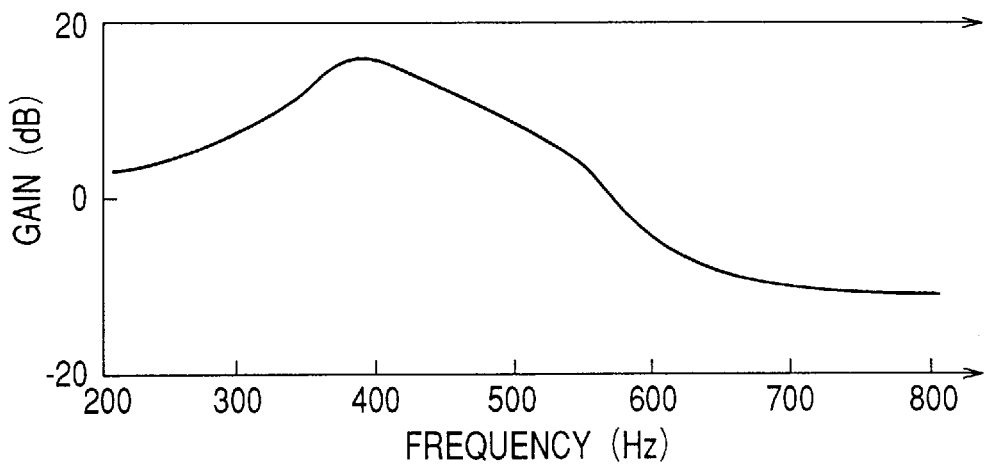
FIG. 14(a) is a graph showing the resonance characteristic of a second mass member with a small mass of the dynamic damper of FIG. 11.
FIG. 14(b) is a graph showing the resonance characteristic of a first mass member with a large mass of the dynamic damper of FIG. 11.
Figure 14:
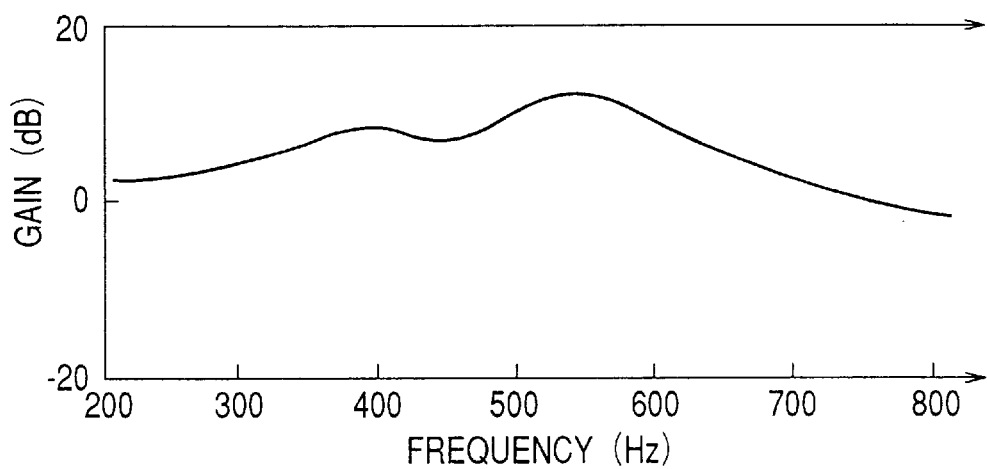

A test was conducted to determine the resonance characteristics of the first and second mass members 62, 63 of the dynamic damper 60 of the instant embodiment. In the test, the dynamic damper 60 was oscillated at a given vibration acceleration, and the magnitudes of oscillation of the first and second mass members 62, 63 were respectively measured at each frequency of vibrations applied to the damper 60. The results of the measurement with respect to the second mass member 63 is indicated in the graph of FIG. 14(a), and the measurement result with respect to the first mass member 62 is indicated in the graph of FIG. 14(b).

Figure 12:
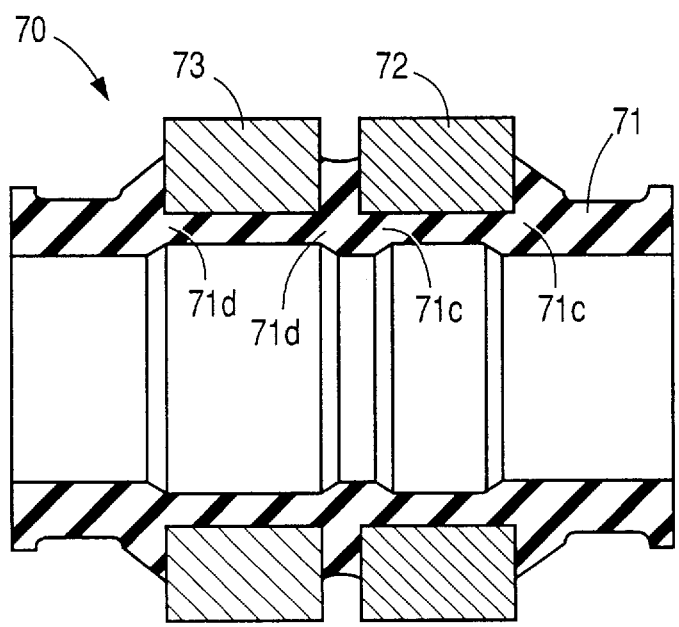
FIG. 12 is a cross sectional view of a dynamic damper as a first comparative example.
Figure 15:
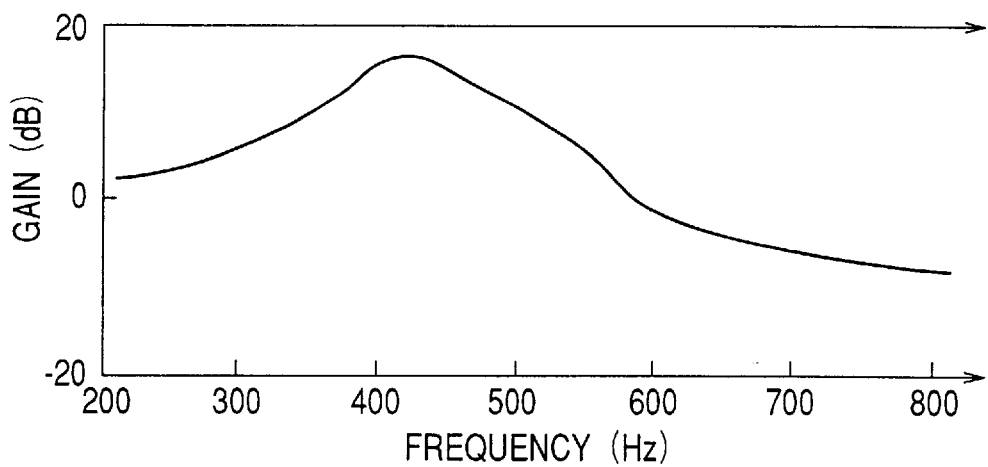
FIG. 15(a) is a graph showing the resonance characteristic of a second mass member with a small mass of the dynamic damper of FIG. 12.
FIG. 15(b) is a graph showing the resonance characteristic of a first mass member with a large mass of the dynamic damper of FIG. 12.
Figure 15:
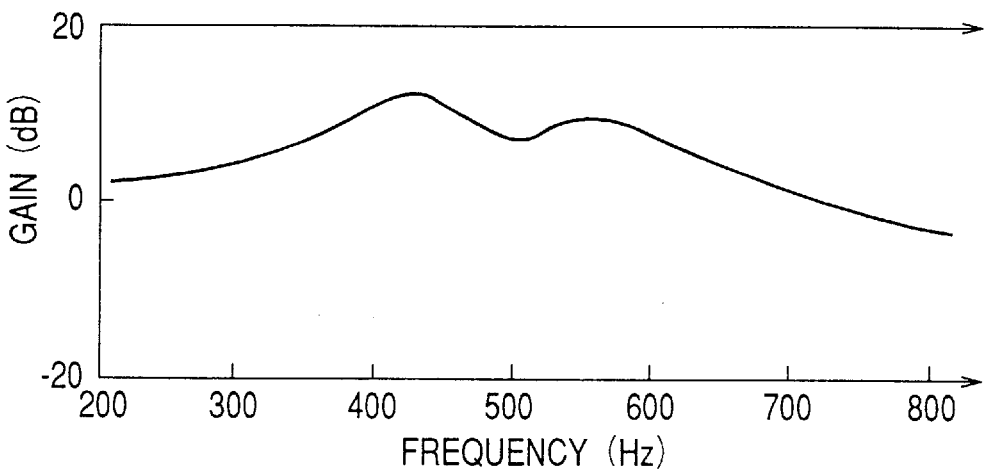

As a first comparative example, there was prepared a dynamic damper 70 having two mass members 72, 73 with the same mass, as shown in FIG. 12. The resonance characteristics of the respective mass members 72, 73 were measured in the same manner as described above. The dynamic damper 70 of this comparative example is different from the dynamic damper 60 as shown in FIG. 11, only in that the shapes of the first and second elastic portions 71c, 71d of the elastic sleeve 71 are changed in accordance with the above changes of the sizes of the first and second mass members 72, 73. The result of the measurement with respect to the second mass member 73 fixed to the second elastic portions 71d is indicated in the graph of FIG. 15(a), and the result of the measurement with respect to the first mass member 72 fixed to the first elastic portions 71c is indicated in the graph of FIG. 15(b).

Figure 13:
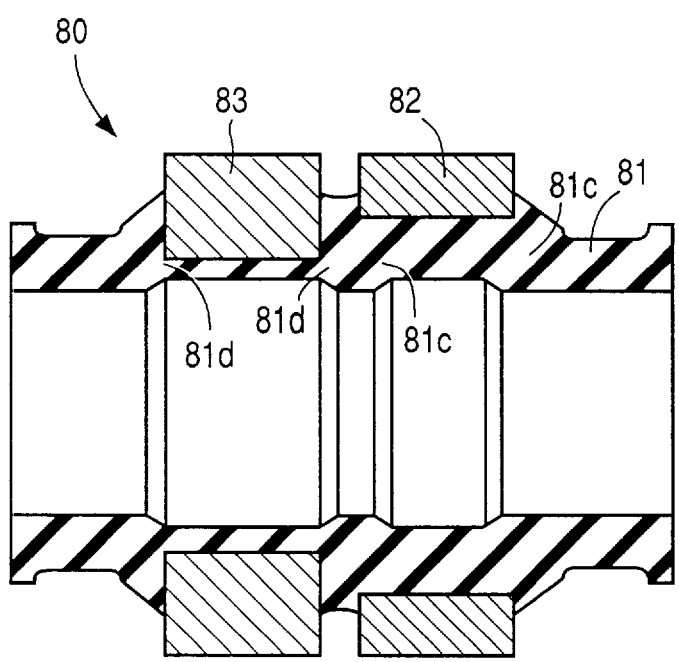
FIG. 13 is a cross sectional view of a dynamic damper as a second comparative example.
Figure 16:
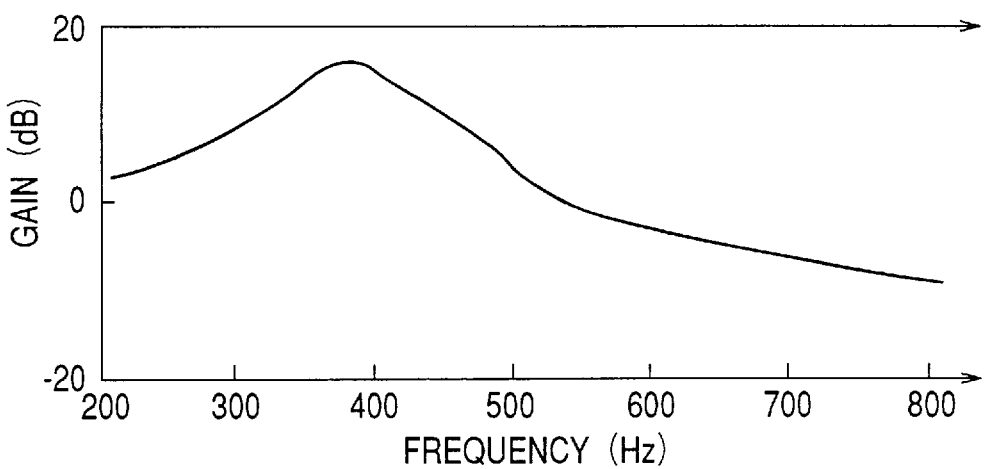
FIG. 16(a) is a graph showing the resonance characteristic of a second mass member with a small mass of the dynamic damper of FIG. 13.
FIG. 16(b) is a graph showing the resonance characteristic of a first mass member with a large mass of the dynamic damper of FIG. 13.
Figure 16:
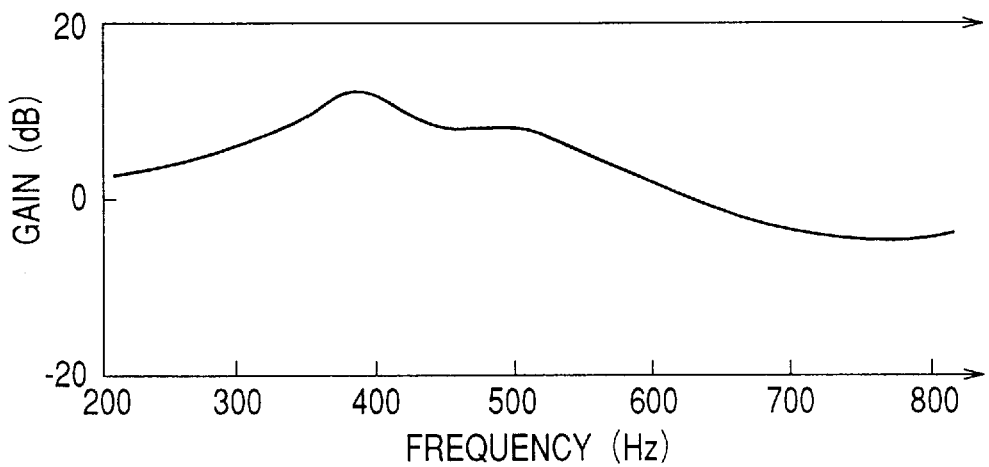

As a second comparative example, there was prepared a dynamic damper 80 having a first mass member 82 with a relatively large mass, and a second mass member 83 with a relatively small mass, which are secured to the first and second elastic portions 61c, 61d, respectively, such that the inside diameter of the first mass member 82 is larger than that of the second mass member 83, as shown in FIG. 13. The resonance characteristics of the respective mass members 82, 83 were measured in the same manner as described above. The dynamic damper 80 of this comparative example is different from the dynamic damper 60 as shown in FIG. 11, only in that the shapes of the first and second elastic portions 81c, 81d of the elastic sleeve 81 are changed in accordance with the changes of the sizes of the first and second mass members 82, 83. The result of the measurement with respect to the second mass member 83 is indicated in the graph of FIG. 16(a), and the result of the measurement with respect to the first mass member 82 is indicated in the graph of FIG. 16(b).

It will be apparent from the graphs of FIGS. 15(a), 15(b), 16(a) and 16(b) that the dynamic dampers 70, 80 of the comparative examples suffered from changes of the natural vibration frequencies of the two damper systems, and reduction in the resonance amplitude and damping effect, whereby the resonance of the first mass member 72, 82 in the the higher resonance frequency range was not sufficiently large.

On the other hand, the dynamic damper 60 of the instant embodiment exhibited excellent damping effects, due to the resonances of the two mass members in the lower and higher resonance frequency ranges, as is apparent from the graphs of FIGS. 14(a) and 14(b).

Figure 17:
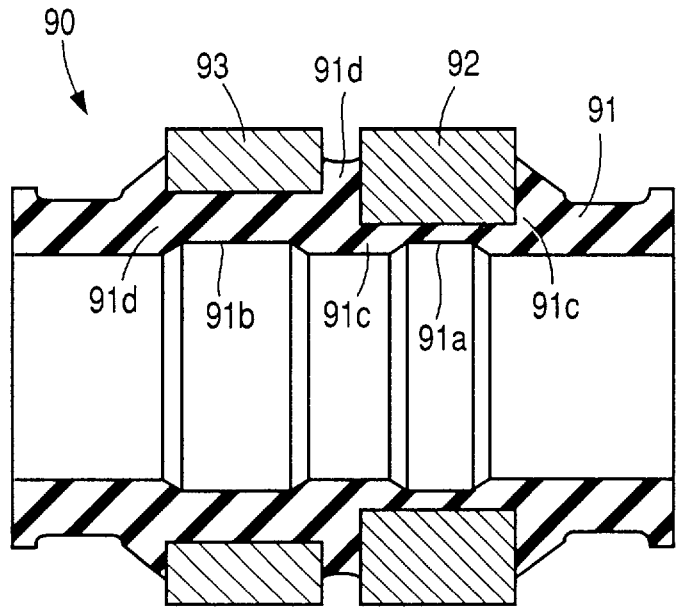
FIG. 17 is a cross sectional view of a fourth embodiment of the dynamic damper of the present invention.

Referring next to FIG. 17, there is shown in cross section a dynamic damper 90 as a fourth embodiment of the present invention, which has substantially the same basic structure as the dynamic damper 60 as shown in FIG. 11, except that the spring constants of first elastic portions 91c and second elastic portions 91d of an elastic sleeve 91 are larger than those of the elastic sleeve 61 of the third embodiment. As in the previous embodiment, the spring constant of the first elastic portions 91c is larger than that of the second elastic portions 91d. More specifically, the elastic sleeve 91 is formed at its inner circumference with first and second circumferential grooves 91a, 91b, which have smaller axial lengths than the first and second grooves 61a, 61b of the third embodiment. In this case, increased parts of the first elastic portions 91c are located between the first mass member 92 and the oscillating member, so as to provide an increased spring component which is elastically deformed due to compression thereof. The second elastic portions 91d also include portions which are interposed between the second mass member 93 and the oscillating member, and which are elastically deformed due to compression thereof during operation.

The dynamic damper 90 as described above provides similar effects as obtained with respect to the dynamic damper 60 of the third embodiment.

Figure 18:
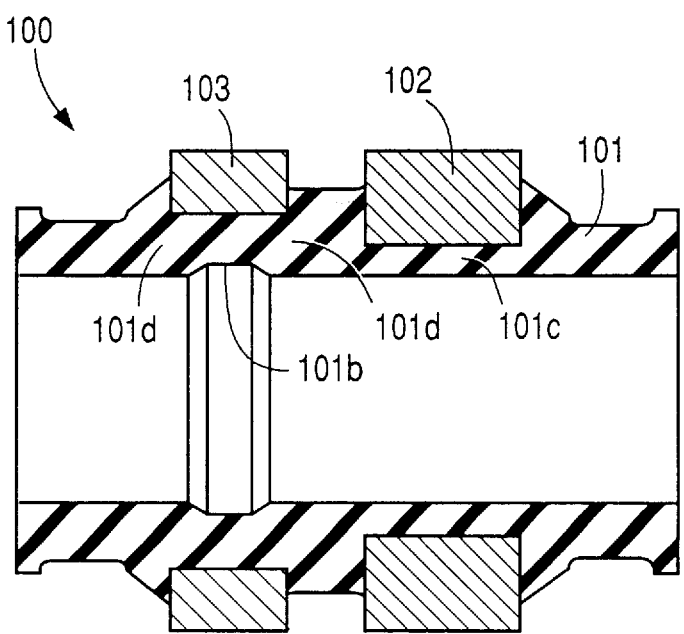
FIG. 18 is a cross sectional view of a fifth embodiment of the dynamic damper of the present invention.

FIG. 18 shows in cross section a dynamic damper 100 as a fifth embodiment of the present invention. The dynamic damper 100 is different from the dynamic damper 90 of the fourth embodiment in the shapes of first elastic portions 101c and second elastic portions 110d of an elastic sleeve 101. That is, the shapes of the first and second elastic portions 101c, 101d are changed such that the spring constants of these elastic portions 101c, 110d are still larger than those of the elastic sleeve 91 of the fourth embodiment. In this embodiment, too, the spring constant of the first elastic portion 101c is larger than that of the second elastic portions 101d. More specifically, the elastic sleeve 91 does not have a first groove equivalent to the first grooves 61a, 91a formed in the inner circumferential surfaces of the elastic sleeves 61, 91 of the previous embodiments, but only has a second groove 101b corresponding to a second mass member 103, which groove 101b has a smaller axial length than that of the second groove 91b of the fourth embodiment. In this arrangement, the first elastic portion 101c is interposed between the first mass member 32 and the oscillating member, over the entire axial length of the mass member 32, so as to provide an increased spring component which is elastically deformed due to compression thereof. Further, increased parts of the second elastic portions 101d are interposed between the second mass member 103 and the oscillating member, so as to provide an increased spring component which is elastically deformed due to compression thereof.

The dynamic damper 100 as described above provides similar effects as obtained with respect to the dynamic damper 60 of the third embodiment.

Figure 19:
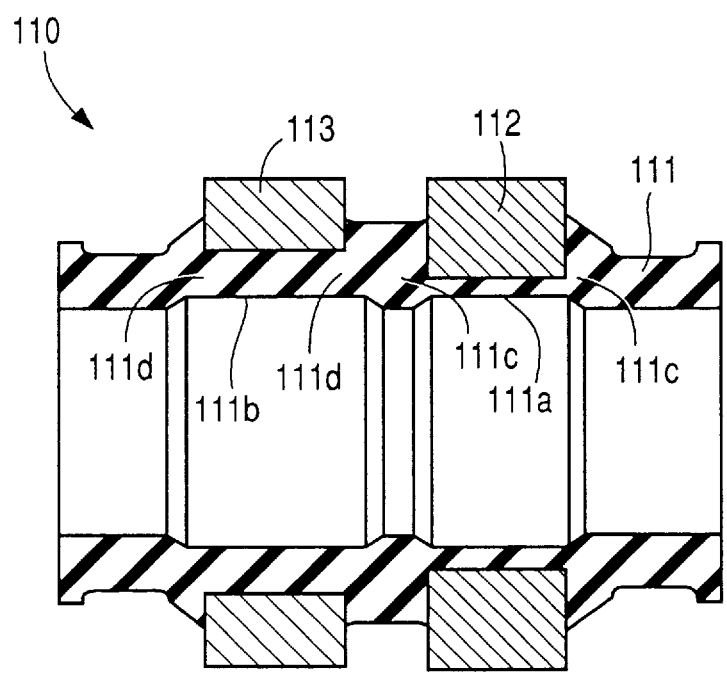
FIG. 19 is a cross sectional view of a sixth embodiment of the dynamic damper of the present invention.

FIG. 19 shows in cross section a dynamic damper 110 as a sixth embodiment of the present invention. The dynamic damper 110 has substantially the same basic structure as the dynamic damper 60 of the third embodiment, except that an elastic sleeve 111 is differently shaped so that the spring constants of its first elastic portions 111c and second elastic portions 111d are smaller than those of the third embodiment. More specifically, the elastic sleeve 111 is formed at its inner circumference with first and second circumferential grooves 111a, 111b, which have larger axial lengths than the first and second grooves 61a, 61b of the third embodiment. In this arrangement, no part of the first and second elastic portions 111c, 111d is present between the first and second mass members 112, 113 and the oscillating member. In operation, these elastic portions 111c, 111d are elastically deformed due to shearing stresses applied thereto when the mass members 112, 113 oscillate. Since the axial length of the second groove 111b is larger than that of the first groove 111a, the spring constant of the second elastic portions 111d is smaller than that of the first elastic portions 41c.

While the present invention has been described in detail in its presently preferred embodiments, for illustrative purpose only, it is to be understood that the invention is by no means limited to the details of the illustrated embodiments, but may be otherwise embodied.

In the dynamic damper 10 of the first embodiment, the spring constants of the first and second rubber members 16, 22 in the radial directions can be easily increased by forming the portions 34 which are to be elastically deformed due to compressive/tensile forces applied thereto. Thus, the shearing spring constant of the rubber connector 44 can be easily set to be smaller than the spring constants of the rubber members 16, 22. Therefore, the circumferential groove 42 is not necessarily formed in the inner circumferential surface of the rubber connector 44.

The first and second rubber members 16, 22 of the dynamic damper 10 may be modified such that the inner circumferential surface(s) of one or both of the rubber layers 26 is/are held in close contact with the outer circumferential surface of the oscillating member 12. Thus, the annular void or voids 32 is/are eliminated, and the portion 34 to be subjected to compressive/tensile forces is formed over the entire axial length of the corresponding mass member. Alternatively, only a portion of the rubber layer 26 corresponding to the axially middle portion of the annular void 32 may be held in contact with the outer circumferential surface of the oscillating member 12, so as to separately form a rubber portion which is to be deformed due to the compressive/tensile forces.

Figure 10:
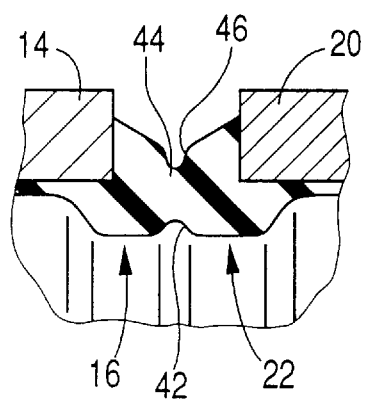
FIG. 10 is a fragmentary view in axial cross section, showing a principal part of another embodiment of the dynamic damper according to the first and second aspects of the present invention.

While the circumferential groove 42 is formed in the inner circumferential surface of the rubber connector 44 in the first and second embodiments, another circumferential groove 46 may be formed in the outer circumferential surface of the rubber connector, as shown in FIG. 10, in place of or in addition to the groove 42.

Further, the axially opposed faces of the first and second mass members 14, 20 are not necessarily aligned with each other in the axial direction. For instance, the inner diameter of the second mass member 20 may be set to be larger than the outside diameter of the first mass member 14.

In the first and second embodiments, the outer circumferential surface of the rubber connector 44 has a generally V-shaped cross section, with the adjacent tapering portions 28, 28 of the first and second rubber members 16, 22 extending from the axially opposed faces of the first and second mass members 14, 20. However, the shape of the rubber connector 44 is not limited to that of the illustrated embodiments, but may be suitably changed so that the dynamic damper exhibits desired vibration damping characteristics. For example, the rubber connector 44 may have a cylindrical outer circumferential surface with a constant outside diameter.

While the portions 34 to be elastically deformed due to compressive/tensile forces are formed between each of the first and second mass members 14, 20 and the oscillating member 12 in the first embodiment, such portions 34 may be formed between only one of the mass members 14, 20 and the oscillating member 12. Likewise, in the second embodiment, only one of the annular voids 32 formed between the mass members 14, 20 and the oscillating member 12 may have an axial length that is equal to or larger than the axial length of the corresponding mass member 14, 20.

While the dynamic dampers of the illustrated embodiments are advantageously mounted on drive shafts of automobiles, the dynamic damper according to the present invention may also be installed on various kinds of rod-like structures, such as various shafts, arms, and conduits for forming fluid passages, so as to dynamically absorb or damp vibrations due to the resonance of the structures, or those transmitted through the structures.

It is also to be understood that the present invention may be embodied with various other changes, modifications and improvements which may occur to those skilled in the art, without departing from the spirit and scope of the invention defined in the following claims.

What is claimed is:

1. A double-mass type dynamic damper mounted on a rod-shaped oscillating member, comprising:

a first damper system including a cylindrical first mass member disposed radially outwardly of the oscillating member, and a first elastic support member for elastically supporting said first mass member for connection thereof with the oscillating member;

a second damper system including a cylindrical second mass member disposed radially outwardly of the rod-shaped oscillating member, and a second elastic support member for elastically supporting said second mass member for connection thereof with the oscillating member;

said first and second damper systems being tuned to two different frequency ranges, said first and second elastic support members being disposed in series in an axial direction of the dynamic damper and connected integrally with each other; and an elastic connector formed by adjacent parts of said first and second elastic support members, for elastically connecting axially opposed faces of said first and second mass members with each other, said first and second elastic support members having respective spring constants as measured in radial directions perpendicular to said axial direction, which spring constants are both larger than a shearing spring constant of said elastic connector that is subjected to shearing force upon relative displacement of said first and second mass members in said radial direction; wherein said elastic connector has a groove formed in at least one of an inner circumferential surface and an outer circumferential surface thereof, said groove extending in a circumferential direction of the dynamic damper between said adjacent parts of said first and second elastic support members.

2. A double-mass type dynamic damper according to claim 1, wherein each of said first and second elastic support members includes at least one portion which is interposed between radially opposed surfaces of a corresponding one of said first and second mass members and said oscillating member, said at least one portion being adapted to be elastically deformed due to compressive and tensile forces applied thereto.

3. A drive shaft of an automobile equipped with a double-mass type dynamic damper as defined in claim 2, which is one of a pair of drive shafts for transmitting drive force to right and left drive wheels of the automobile, and one has a smaller axial length than the other of said pair of drive shafts.

4. A double-mass type dynamic damper according to claim 1, wherein an annular void is formed in a circumferential direction of the dynamic damper between radially opposed surfaces of each of said first and second mass members and said oscillating member, said annular void having an axial length that is not smaller than an entire axial length of a corresponding one of said first and second mass members, whereby said first and second elastic support members are prevented from being deformed solely by compression thereof.

5. A drive shaft of an automobile equipped with a double-mass type dynamic damper as defined in claim 4, which is one of a pair of drive shafts for transmitting a drive force to right and left drive wheels of the automobile, which one has a larger axial length than the other of said pair of drive shafts.

6. A double-mass type dynamic damper according to claim 1, wherein a ratio of said shearing spring constant of said elastic connector to each of said spring constants of said first and second elastic support members as measured in said radial directions is not smaller than ½.

7. A double-mass type dynamic damper mounted on a rod-shaped oscillating member, comprising:

a cylindrical elastic structure disposed radially outwardly of the oscillating member, and having a first elastic support member having a first spring constant and a major portion which is subjected to compressive force, and a second elastic support member having a second spring constant smaller than said first spring constant and a major portion which is subjected to shearing force, said first and second elastic support members being formed integrally with each other in an axial direction of the dynamic damper;

a first mass member fixed to an outer periphery of said first elastic support member, and being tuned so as to damp high-frequency vibrations; and a second mass member fixed to an outer periphery of said second elastic support member, and being tuned so as to damp low-frequency vibrations, said second mass member having a mass which is smaller than that of said first mass member.

8. A double-mass type dynamic damper according to claim 7, wherein a first circumferential groove is formed in the inner circumferential surface of said first elastic support member such that said first groove is radially aligned with said first mass member and has an axial length smaller than that of said first mass member, while a second circumferential groove is formed in the inner circumferential surface of said second elastic support member such that said second groove is radially aligned with said second mass member and has an axial length larger than that of said second mass member.

9. A double-mass type dynamic damper mounted on a rod-shaped oscillating member, comprising:

- a first damper system including a cylindrical first mass member disposed radially outwardly of the oscillating member, a first elastic support member for elastically supporting said first mass member for connection thereof with the oscillating member, and a first annular void that is formed in a circumferential direction of the dynamic damper between radially opposed surfaces of said first mass member and said oscillating member;
- a second damper system including a cylindrical second mass member disposed radially outwardly of said rod-shaped oscillating member, a second elastic support member for elastically supporting said second mass member for connection thereof with said oscillating member, and a second annular void that is formed in a circumferential direction of the dynamic damper between radially opposed surfaces of said second mass member and said oscillating member;
- an elastic connector formed by adjacent parts of said first and second elastic support members, for elastically connecting axially opposed faces of said first and second mass members with each other, said first and second elastic support members having respective spring constants as measured in radial directions perpendicular to said axial direction, which spring constants are both larger than a shearing spring constant of said elastic connector that is subjected to shearing force upon relative displacement of said first and second mass members in said radial direction; wherein
- each of said first and second elastic support members includes at least one portion that is interposed between radially opposed surfaces of a corresponding one of said first and second mass members and said oscillating member, said at least one portion being adapted to be elastically deformed due to compressive and tensile forces applied thereto.

10. A double-mass dynamic damper according to claim 9, wherein said at least one portion of each of said first and second elastic support members is defined by a corresponding one of said first and second annular voids having an axial length that is smaller than an entire axial length of a corresponding one of said first and second mass members.

11. A double-mass dynamic damper according to claim 9, wherein said elastic connector has a groove formed in at least one of an inner circumferential surface and an outer circumferential surface thereof, said groove extending in a circumferential direction of the dynamic damper between said adjacent parts of said first and second elastic support members.

12. A double-mass damper according to claim 9, wherein a ratio of said shearing spring constant of said elastic connector to each of said spring constants of said first and second elastic support members as measured in said radial directions is not smaller than ½.

13. A drive shaft of an automobile equipped with a double-mass type dynamic damper as defined in claim 9, which is one of a pair of drive shafts for transmitting drive force to right and left drive wheels of the automobile, and has a smaller axial length than the other of said pair of drive shafts.

* * * * *